Dec. 6, 1966  J. J. McLAUGHLIN  3,289,817
MOVABLE BED FOR BELT CONVEYOR
Filed July 22, 1965  2 Sheets-Sheet 1
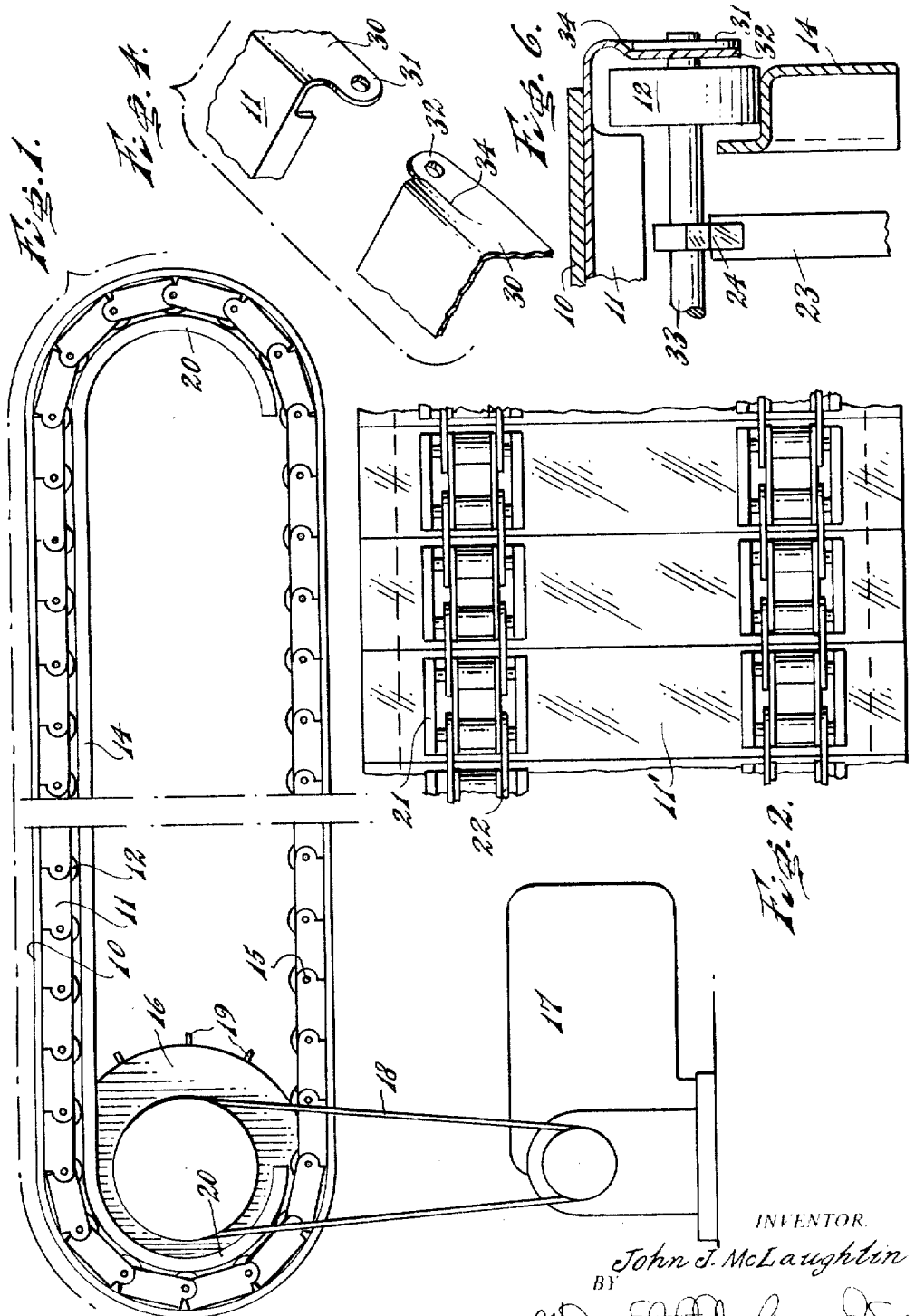
INVENTOR.
John J. McLaughlin
BY
ATTORNEYS

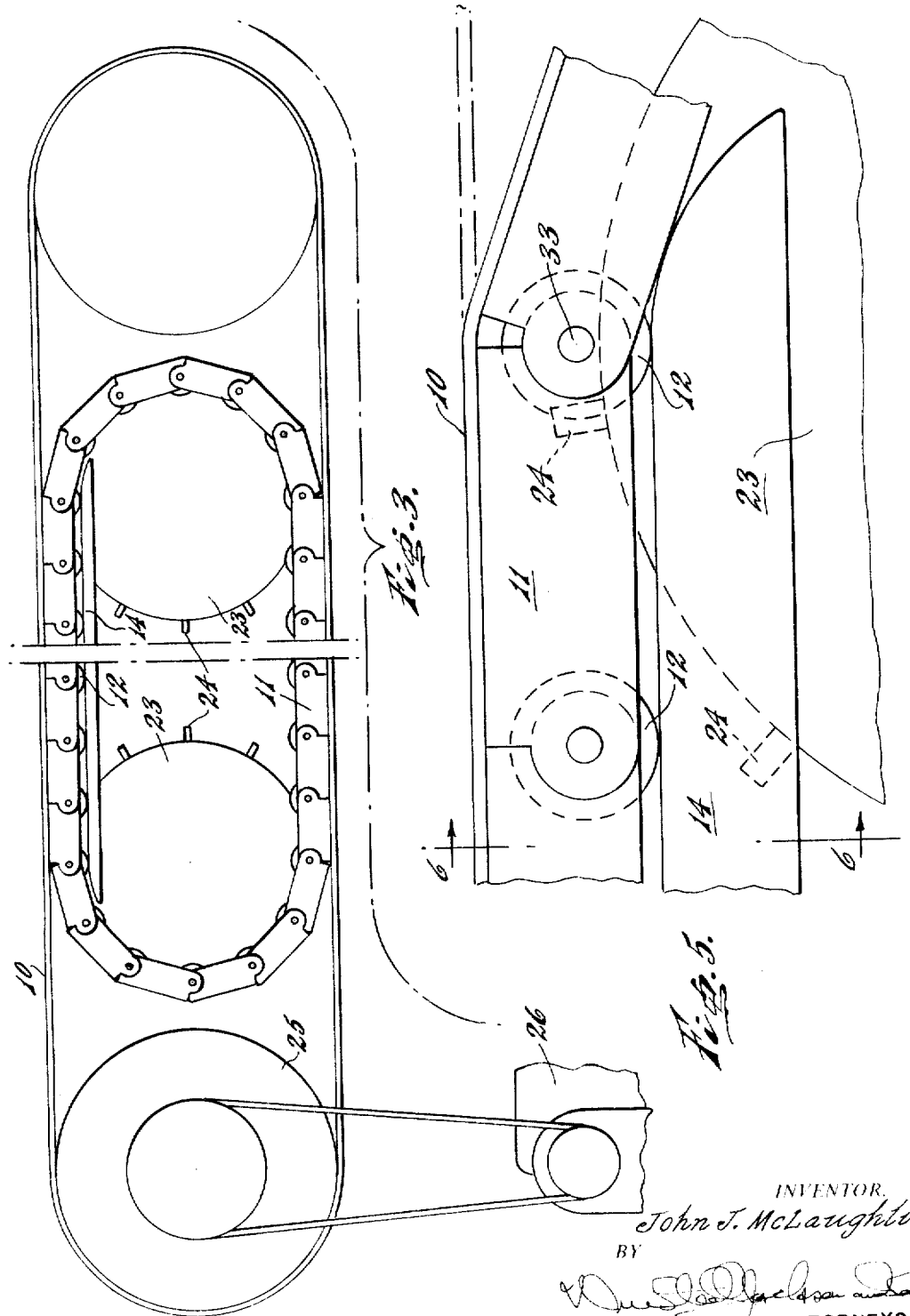

United States Patent Office 3,289,817
Patented Dec. 6, 1966

3,289,817
MOVABLE BED FOR BELT CONVEYOR
John J. McLaughlin, Chapel Road, R.D. 2,
Ellwood City, Pa.
Filed July 22, 1965, Ser. No. 474,135
6 Claims. (Cl. 198—184)

This invention relates to a movable load supporting bed for an endless belt conveyor.

An object of this invention is to provide a conveyor belt which will have a continuous rigid support along its entire load carrying surface.

An additional object of this invention is to provide a support for an endless conveyor which is movable therewith thereby maintaining a stationary relationship between the belt and its support over its entire load carrying area.

A further object of this invention is to provide a load supporting bed for an endless belt conveyor that is movable therewith with very little friction loss.

An additional object of this invention is to support a load placed on a conveyor belt with an endless movable roller supported belt disposed below the endless conveyor belt.

A further object of this invention is to provide a more economical and useful passenger conveyor which will be firmly supported over its entire load carrying area.

Conveyors have long been used for the transportation of articles and materials of all shapes and sizes. Conveyors necessarily have to have some degree of flexibility in order to make them continuous. In the movement of materials it is not always necessary to continuously support the conveyor along its entire load carrying area and thus slight depressions or sagging between the supporting rollers is not considered detrimental. However, since conveyors have been more recently used in the mass movement of persons, it has become necessary to provide a firm support beneath the conveyor in order to prevent any sagging in the belt. Such conveyors have been used, for example, in popular exhibits wherein it is necessary to keep the spectators moving in order to avoid time delaying jams. They are also being used in such places as airline terminals, railroad stations, expositions, and large shopping and parking areas where it is necessary to get passengers and patrons transported quickly to their proper destination. Heretofore, such conveyors have been supported with stationary rigid aprons extending under and along the entire load carrying portion of the conveyor. These stationary aprons or supporting surfaces, however, necessarily create a great deal of friction between themselves and the belt which is sliding over them. Because of this friction, the conveyors have a limited load carrying capacity, for as the load increases the frictional forces increase, causing the movement of the conveyor to become jerky. A passenger conveyor must necessarily provide a smooth transport, as any unexpected change in movement of the belt could cause an unsuspecting passenger to lose his balance.

Accordingly, an object of this invention is to provide a conveyor belt for the transport of people or packages or the like which will be safe in operation and capable of operating at a constant speed and a faster speed than has heretofore been obtainable in such conveyors. This can be accomplished by supporting a belt conveyor such as a moving sidewalk with a series of carrier or tray-like elements pivotally interconnected with one another to form a continuous supporting belt for the moving sidewalk. The elements are separately roller mounted on a track or similar guiding element so that there is relatively little friction encountered between moving parts with less variation in the speed or position of the conveyor belt. By having the supporting elements roller mounted, the support belt is movable and thus capable of traveling simultaneously with the conveyor belt, thereby affording a firm and continuous underpinning to the conveyor at all points along its load carrying portion. In this specification and in the claims, the expression "roller mounted" or "roller means" is intended to include not only rollers in the conventional sense but any type of rotatably mounted movable element such as a chain link or similar type device.

The movable supporting means of this invention is to be distinguished from the use of an auxiliary continuous belt which travels with and beneath a conveyor belt where the support for the conveyor is no greater than the rigidity of the flexible auxiliary belt itself. In order to have a firm supporting surface in such a conveyor, it is necessary to run it over a fixed or rigid surface to prevent it from sagging. However, then objectionable frictional forces are encountered between the surface and the belt. In contrast, the mechanism of this invention makes it possible to provide longer and wider passenger conveyor belts due to the drastic reduction of friction in the conveying surface while still maintaining firm support for the load carrying surface of this conveyor.

Other objects and features of this invention will be more apparent from the following description of the drawings.

FIGURE 1 is a side elevation of a conveyor belt showing the roller mounted load supporting bed associated therewith.

FIGURE 2 is an alternate form of the invention showing the underside of a chain mounted, load supporting bed.

FIGURE 3 shows the use of a movable load supporting bed between the end rolls of a passenger or similar conveyor belt.

FIGURE 4 is an enlarged perspective view depicting the pivotal connection and relationship between the individual supporting elements making up the load supporting bed.

FIGURE 5 is an enlarged fragmentary view showing the engagement of the supporting bed with an end sprocket roller.

FIGURE 6 is a fragmentary sectional view taken along the line 6—6 of FIGURE 5.

Referring to FIGURE 1, a continuous conveyor belt 10 such as a passenger conveyor is supported by a series of interconnected carrier elements 11 which form a continuous and movable supporting bed for the conveyor belt. The elements 11 are pivotally interconnected at 15 with a suitable rod which also serves as an axle for the roller elements 12 which are mounted on and guided by the tracks 14. The supporting belt is advanced by drum 16 which is driven by motor 17 through a suitable pulley belt 18. The drum 16 has sprockets 19 thereon which engage the axles of the carrier elements thus advancing the bed. The two ends of the bed are supported by the roller elements riding on the curved extensions 20 of the track guide members.

In this embodiment the conveyor belt which is rigidly supported across its entire load carrying surface is motivated by the frictional force between it and the support bed. Since the bed moves with the belt along the track, the only moving frictional forces encountered are those between the wheels and the track.

FIGURE 2 shows an alternative form of mounting the movable supporting bed. In this embodiment, a link type chain 21 is mounted on the underside of each carrier element, the connecting links 22 between them being used to pivotally interconnect each element. Conveniently, a gear adapted to mate with the chain could be used in place of the sprocket drum, the tracks supporting these roller mounted carrier elements as they move the conveyor belt which can be driven by any convenient means. In this embodiment, the aprons on the sides of the elements, which are used to pivotably connect the elements together, could be eliminated for the chain links themselves will pivotally interconnect the series of carrier or supporting elements.

In FIGURE 3 the support belt is alternatively positioned between the end rolls of a similar passenger conveyor or moving sidewalk 10. The supporting belt would be positioned under that area where it is desired to have a continuously supported surface. The interconnected carrier elements 11 are mounted so as to roll on tracks 14 while they are in supporting position. The tracks may either circle the end and act as an end support for the supporting bed as shown in FIG. 1 or they may terminate at the point where the axle of the supporting element will engage a sprocket wheel 23 as shown in FIGURE 3. If the track is continued around and used as an end support member, the sprocket roll need not be included unless it is used to drive the supporting bed. In this embodiment, the belt conveyor is power driven by positive roll 25 which is driven by motor 26. Since the friction between the conveyor 10 and the bed of supporting elements is considerably greater than the friction between the rollers 12 on the track 14, the supporting belt will move simultaneously with the movement of the conveyor belt thus affording continuous support under the load carrying area.

The individual roller mounted carrier elements have aprons 30 with a forward extension 31 and a rearward extension 32. In order to form a continuous belt of said supporting elements, they are pivotally interconnected with axle 33 of the rollers through the extensions 31 and 32 which overlap one another on adjacent supporting elements. The apron is slanted inwardly at 34 (see FIGURE 6) so that the extension 32 of one element will be able to fit behind the extension 31 of the next succeeding one, thus affording an outer surface which is substantially flush with the edge of the passenger conveyor. As the trays or elements reach the return sprocket wheel 23 in the form shown in FIGURE 3, the sprockets 24 will engage the axles 33 of the rollers 12. If the track is not used as a guiding element, it terminates at this point thus allowing the elements to follow the return rolls, the elements separating on the supporting surface as they pivot about the roller axle 33 as shown in FIGURE 5. If the conveyor is driven by the supporting belt from beneath it will follow the supporting elements around the roll 23 or if it is independently driven, in which case the supporting belt will be driven by the conveyor belt, the conveyor can conveniently continue on as shown in phantom in this view.

The movable supporting belt of this invention can readily be driven in either direction and thus it can conveniently be used with passenger conveyors wherein it is necessary to continuously change or alternate the direction of movement of the passengers.

From the foregoing description it will be seen that all of the objects of the invention are accomplished. It will be understood, however, that while the embodiments shown may include many of the patentable features thereof, the invention in its broadest aspect is not limited thereto, and modifications and substitutions of equivalents may be resorted to within the scope of the following claims.

Having thus described my invention what I claim as new and desire to secure by Letters Patent is:

1. A movably supported passenger conveyor comprising in combination, an endless conveyor belt, a movable load supporting belt traveling with and beneath the conveyor and in frictional engagement therewith while firmly supporting the conveyor through its load carrying area, said supporting belt comprising a plurality of rigid carrier elements, each of said elements having a flat upper surface and being pivotally interconnected to form a load supporting belt providing a substantially flat and continuous load supporting surface for the conveyor, a fixed support extending along the load carrying area of the conveyor and roller means associated with said supporting belt for relatively frictionless movement of the supporting belt along the fixed support.

2. A movably supported passenger conveyor of claim 1, wherein said conveyor belt is power driven and imparts motion to the load supporting belt due to frictional engagement therewith.

3. A movably supported passenger conveyor of claim 1, wherein said load supporting belt is power driven and imparts motion to the conveyor belt due to frictional engagement therewith.

4. A movably supported passenger conveyor of claim 1, wherein the conveyor belt provides a non-slip surface.

5. A movably supported passenger conveyor comprising in combination, an endless conveyor belt, means for driving said conveyor belt, a pair of spaced tracks disposed beneath and along the load carrying area of the conveyor, a movable load supporting belt traveling in frictional engagement with said conveyor through its load carrying portion, said supporting belt comprising a plurality of rigid plates having a flat upper surface and rollers mounted for movement along said tracks, said plates being pivotally interconnected to form a load supporting belt having a substantially continuous and flat load supporting surface for firmly supporting and movable with the conveyor along its load carrying area.

6. A movably supported passenger conveyor comprising in combination, an endless conveyor belt, a pair of spaced tracks disposed beneath and extending along the load carrying area of the conveyor, a movable load supporting belt traveling in frictional engagement with said conveyor comprising a plurality of rigid plates having a flat upper surface and rollers mounted for movement along said tracks, said plates being pivotally interconnected to form a load supporting belt having a substantially continuous and flat load supporting surface for firmly supporting and movable with the conveyor through its load carrying area and means for driving said supporting belt to impart motion to the conveyor due to the frictional engagement therewith.

References Cited by the Examiner

UNITED STATES PATENTS

| 516,702 | 3/1894 | Franklin | 198—195 |
| 733,804 | 7/1903 | Blaisdell | 198—203 X |
| 1,706,905 | 3/1929 | Stockly et al. | 198—203 X |
| 1,718,737 | 6/1929 | Freilino | 198—195 |
| 1,758,397 | 5/1930 | Harber | 198—195 |
| 1,820,634 | 8/1931 | Simmons et al. | 198—16 |
| 2,628,705 | 2/1953 | Kline et al. | 198—195 |
| 2,868,356 | 1/1959 | Haaf | 198—203 |
| 3,034,638 | 5/1962 | Franz | 198—195 |
| 3,195,712 | 7/1965 | Boschi | 198—16 X |

EVON C. BLUNK, *Primary Examiner.*

M. L. AJEMAN, *Assistant Examiner.*